(12) United States Patent  
Elliott

(10) Patent No.: US 9,144,234 B1  
(45) Date of Patent: Sep. 29, 2015

(54) FOOT OPERATED ANIMAL CALL

(71) Applicant: Deane Owen Elliott, Woodbridge, VA (US)

(72) Inventor: Deane Owen Elliott, Woodbridge, VA (US)

( * ) Notice: Subject to any disclaimer, the term of this patent is extended or adjusted under 35 U.S.C. 154(b) by 0 days.

(21) Appl. No.: 14/062,676

(22) Filed: Oct. 24, 2013

Related U.S. Application Data

(60) Provisional application No. 61/718,157, filed on Oct. 24, 2012.

(51) Int. Cl.
*A01M 31/04* (2006.01)
*A01M 31/00* (2006.01)

(52) U.S. Cl.
CPC .................... *A01M 31/004* (2013.01)

(58) Field of Classification Search
USPC .................. 446/397, 402, 404, 418, 421, 422
See application file for complete search history.

(56) References Cited

U.S. PATENT DOCUMENTS

| | | | | |
|---|---|---|---|---|
| 2,475,542 A * | 7/1949 | Boykins | ....................... | 84/422.1 |
| 2,785,596 A * | 3/1957 | Korosh | ....................... | 84/422.1 |
| 5,402,102 A * | 3/1995 | Lachance | .................... | 340/404.1 |
| 5,613,891 A | 3/1997 | Lamo | | |
| 6,003,261 A * | 12/1999 | French | ............................... | 43/1 |
| 6,042,452 A * | 3/2000 | Niebrugge | .................... | 446/397 |
| 6,053,793 A | 4/2000 | Green | | |
| 6,328,623 B1 * | 12/2001 | Bean | ............................ | 446/208 |
| 6,755,714 B1 * | 6/2004 | Huddleston | ................... | 446/207 |
| 7,785,166 B1 | 8/2010 | Kirby | | |
| 2007/0155282 A1 * | 7/2007 | De Sousa | ...................... | 446/418 |
| 2012/0156959 A1 * | 6/2012 | Kennedy | ...................... | 446/208 |

* cited by examiner

*Primary Examiner* — Kurt Fernstrom  
(74) *Attorney, Agent, or Firm* — Andrew D. Mead

(57) ABSTRACT

A foot-operated animal call device having a base and a moveable pedal moving at least one sound generator to simulate the sound of the quarry animals, especially deer during mating season. The call device is capable of producing multiple, pre-determined call sounds using a foot operated device leaving the user's hands free to hold and fire a gun or bow.

13 Claims, 3 Drawing Sheets

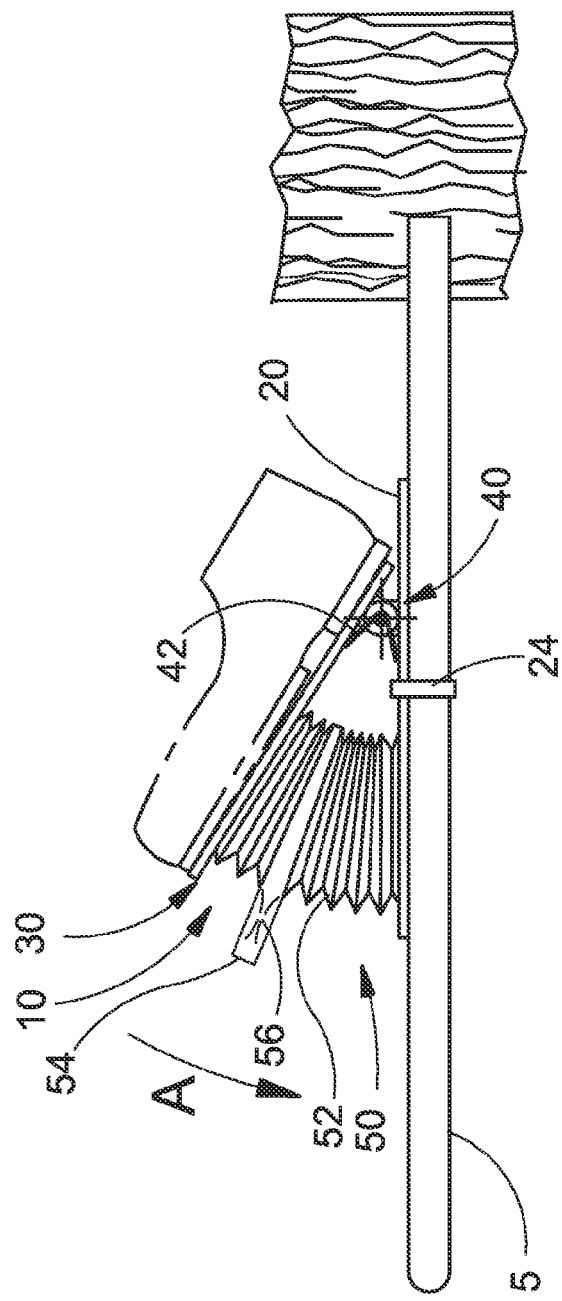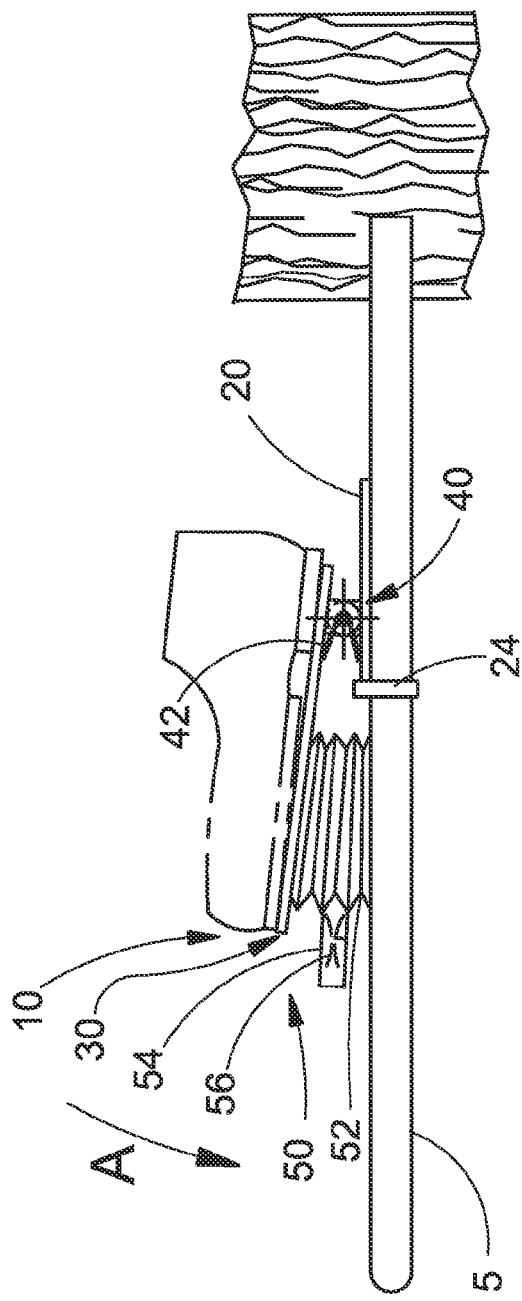

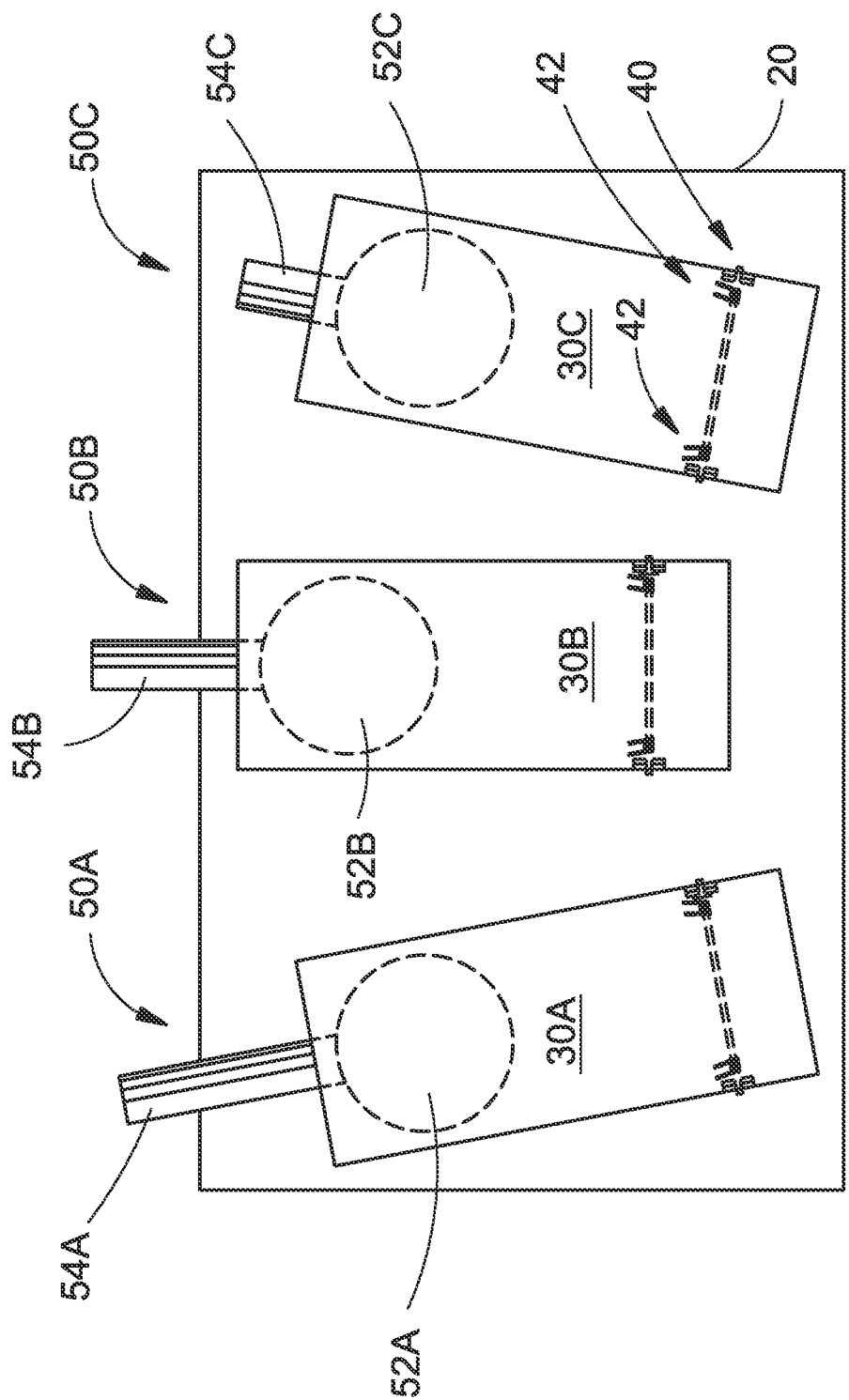

FOOT OPERATED ANIMAL CALL

CROSS REFERENCE TO RELATED APPLICATIONS

This application claims the benefit of priority to U.S. Provisional patent application entitled "FOOT ACTIVATED DEER GRUNT", Ser. No. 61/718,157, filed on Oct. 24, 2012.

BACKGROUND OF THE INVENTION

This invention relates generally to devices for attracting animals, and more particularly to a foot activated device for simulating deer sounds.

When deer hunting, it is often desirable to "call" deer by simulating various sounds that deer produce in the wild. One such sound is that of a fawn "bleating". This sound is used to call female deer (does) in to look for a lost or distressed fawn. Another sound is that of a female doe looking for other does to join. Another sound is that of a doe that is heat and desirous of mating with a buck. A further sound is that of a buck seeking a doe for mating purposes. Another sound is that of a buck "grunting" during a fight or a buck looking for a fight. A last type includes a so-called "snort wheeze" sound. These various sounds may be simulated by a hunter during different times of the hunting season to attract deer.

Generally, these sounds are simulated by blowing in a deer call that has a reed mechanism and a means for varying the tone by varying the position of an O-ring along the reed. Another device is a can-shaped device that produces a bleat when inverted.

One major drawback of these types of calls is that they require the use of at least one of the hunter's hands. This takes the hunter's hand or hands off of his weapon and also produces movement that can be seen by the deer. Additionally, the bucks that respond to these situations often appear very quickly and are running towards the action. This does not leave much time for the hunter to set down his calls in order to pick up his bow or firearm.

It would be beneficial to provide a deer call capable of producing the multiple sounds that does not require the use of hands to operate. Additional benefits would be realized by a deer call that provides interchangeable sound making portions so that the device can tailored to simulate different sounds.

SUMMARY OF THE INVENTION

Accordingly, the present invention, in any of the embodiments described herein, may provide one or more of the following advantages:

It is an object of the present invention to provide a foot-operated deer call device that includes at least one moveable foot pedal connected to a base member. The foot pedal is spring biased into a first position. A sound generating apparatus including a bellows apparatus is disposed between the foot pedal and the base member. Depressing the foot pedal compresses the bellows creating an air flow through a tube member containing a reed. The air flow vibrates the reed to generate the sound. Multiple foot pedals may be provided to increase the number of available deer calls.

It is another object of the present invention to provide a compact foot-operated deer call device that is easily used by a hunter in a confined space. A foot operated device has a base and a moveable foot pedal. The foot pedal is moveable in opposing directions about a central or neutral position. A spring mechanism is used to bias the foot pedal in the neutral position. A sound generating apparatus is disposed between each opposing end of the foot pedal and the base so that a first sound is generated by depressing the pedal in a first direction from the neutral position and a second sound is generated by depressing the pedal in the opposite direction from the neutral position. The base may be anchored to the ground or secured to a platform by a strap to prevent unwanted movement.

It is yet another object of the present invention to provide a foot-operated deer call that may be configured to produce one or more animal call sounds selected from among a group of animal call sounds. Each sound generating bellows and reed apparatus includes a reed adjuster that enables the pitch of the reed to be selectively varied. The sound generating apparatus may also be removed and replaced for animal call sounds that exceed a specific reed's adjustment range or to replace a bellows/reed apparatus with an alternate sound generating device.

It is still another object of the present invention to provide a foot-operated deer call that is durable in construction, inexpensive of manufacture, carefree of maintenance, and simple and effective to use.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is an elevation view of a typical tree stand platform supporting an animal call incorporating principles of the present invention, the animal call shown in a first position;

FIG. 2 is an elevation view of the animal call of FIG. 1 shown in a second position;

FIG. 3 is a plan view of a first embodiment of the present invention illustrating the inclusion of three distinct animal calls;

DESCRIPTION OF THE PREFERRED EMBODIMENT(S)

Figure 4:
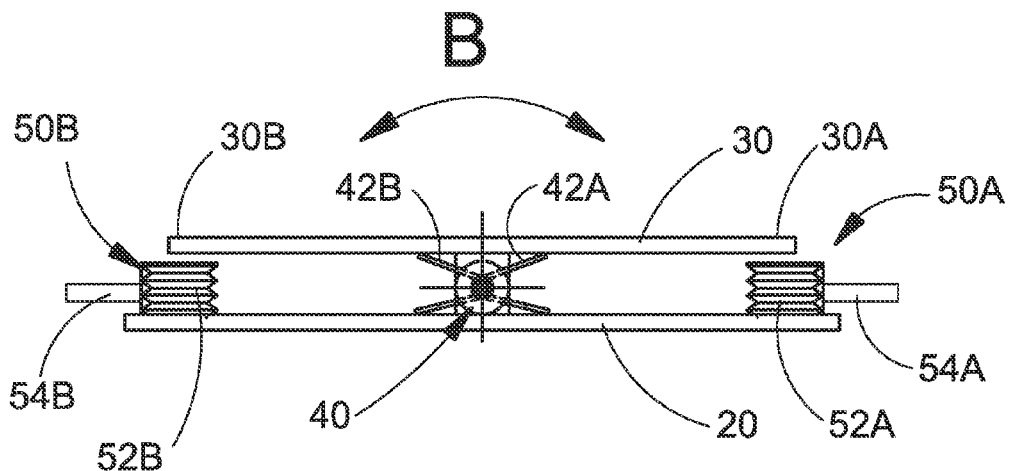
FIG. 4 is an elevation view of a second embodiment of the present invention shown in a neutral position in which no sound is call produced.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience, and are determined from a vantage on level ground. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

First referring to FIGS. 1 and 2, a foot-operated animal call 10 is illustrated positioned on a platform 5, such as a tree stand, as it would be typically used. The animal call includes a base member 20 for supporting the call 10 or for securing the call to the ground or the platform, as shown using an anchor strap 24 or the like. A pedal portion 30 is moveably connected to the base member 20 by a moveable connection 40 which allows the pedal portion 30 to move in relation to the base portion 20, preferably by pivoting motion about an axis. A sound generator 50 is positioned between the pedal portion 30 and the base member 20 so that movement of the pedal portion 30 acts upon the sound generator 50.

The pedal portion 30 is moveable between an uppermost first position, as generally illustrated in FIG. 1, and a second position in which the pedal is depressed, shown in FIG. 2. As the pedal portion is depressed and moved toward the second position (direction arrow "A"), the sound generator 50 is compressed and sound generated. Some sound generators may also generate sound in the reverse direction, that is, sound is created as the sound generator 50 is moved from a compressed state (shown in FIG. 2) to a relaxed state (shown in FIG. 1). A spring 42 is preferably provided to bias the pedal portion toward the upper position (FIG. 1) when foot pressure is released. The spring return enables the user to create realistic animal calls that require repletion of a single sound by repeatedly depressing the pedal portion. Additionally, the speed with which the pedal is depressed or allowed to return may also be controlled by the user to further tailor the characteristics of the call sound.

The sound generator 50 is preferably a pneumatic apparatus comprising a bellow 52, an air conduit 54 and a reed 56 disposed within the conduit 54. Reed sound is easily adjusted by altering the vibrating length of the reed, commonly accomplished by positioning an O-ring at varying distances from the end of the reed. The bellow 52 may also be in the form of a flexible bladder as is used in many types of known deer grunts. Other forms of sound generators which produce sounds based on changes in relative positions of two structural elements may also be used. The sound generator 50 is simply secured to the base plate using conventional fastening means and may be easily exchanged for alternate sound generators producing different call sounds.

As reed adjustments typically require partial disassembly of the sound generator, a first embodiment of the animal call invention 10 is shown in FIG. 3 to include three individual pedal portions 30A, 30B, 30C each connected to the base member 20 by moveable connections 40. The pedal portions each act upon respective individual sound generators 50A, 50B, 50C thereby enabling the animal call 10 to be configured, by adjusting the reed lengths, to selectively produce three distinct animal call sounds. The positioning of the pedals portions 50 on the base member 20 may be varied to provide adequate clearance for large boots typically worn by hunters. As illustrated, the center pedal portion 30B is positioned out of line with the outboard pedals 30A, 30C to improve side clearance for a boot on the middle pedal portion 30B. The pedal portions 30 may also be arranged in an arc which would allow a user to select a pre-determined specific call by pivoting his or her foot laterally with the heel positioned on the base member.

Additional pedal portions and sound generators may be incorporated as needed to achieve the desired number of unique calls. It is noted that as the number of calls is increased, the size of the base portion increases and the call device overall become less portable. Three is the preferred maximum number, offering an acceptable balance between the number of unique calls and call device size.

Figure 5:
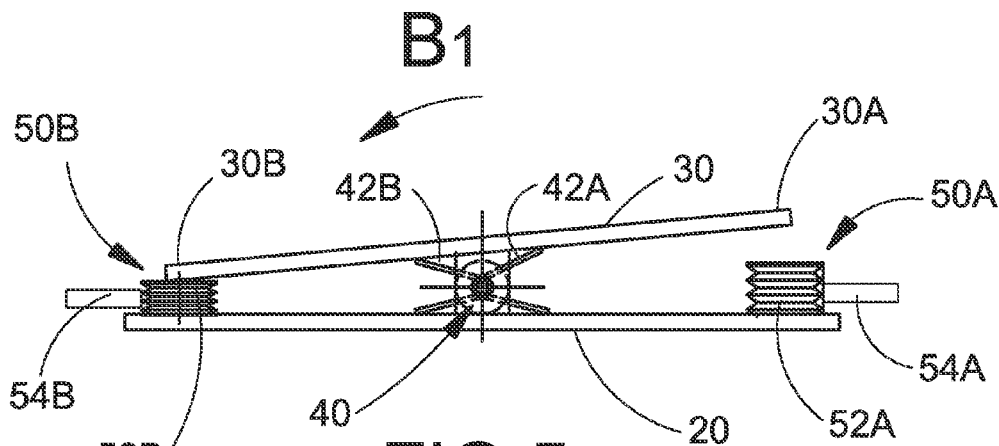
FIG. 5 is an elevation view of the animal call of FIG. 4 shown in a first position, movement to which creates a first animal call sound.
Figure 6:
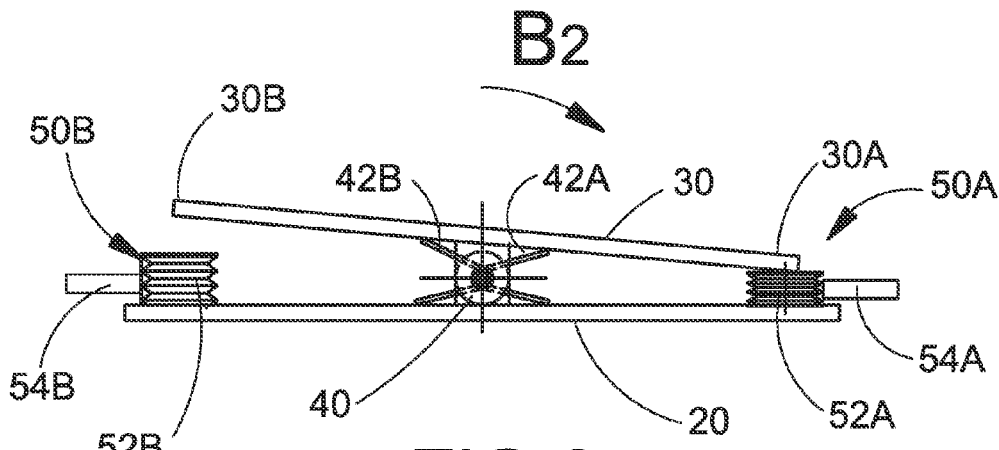
FIG. 6 is an elevation view of the animal call of FIG. 4 shown in a second position, movement to which creates a second animal call sound.

It is not always necessary to be capable of producing three or more different animal sounds in a single hunting expedition. A more compact second embodiment is illustrated in FIGS. 4 through 6 in which the moveable connection 40 is positioned between the opposing ends 30A, 30B of pedal portion 30 so that the pedal portion can pivot in either direction about a neutral position (arrow "B" in FIG. 4). Two sound generators 50A, 50B are provided, with one sound generator being positioned between each pedal end 30A, 30B and the base portion. Depressing the pedal portion in a first direction (arrow "B1" in FIG. 5) engages a first sound generator 50B while depressing the pedal portion in the opposite direction (arrow "B2" in FIG. 6) engages the second sound generator 50A. Movement of the pedal portion in one direction engages only one of the sound generators; the other sound generator remains disengaged until the pedal is depressed in its direction. One or more springs 42A, 42B maintain the pedal portion 30 normally in an intermediate position so that neither sound generator 50A, 50B is engaged to produce a call sound when no foot pressure is applied to the pedal. In the event that additional call sounds become necessary, the individual sound generators may be adjusted or swapped out so that the more compact call is not disadvantaged by limitations in the variety of calls it is capable of producing.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

I claim:

1. A foot-operated animal call comprising:
    a fixed base portion;
    a moveable pedal portion pivotally connected to the base portion and moveable between a neutral position and a depressed position; and
    a sound generator disposed between the pedal portion and the base portion, movement of the pedal portion toward the depressed position compressing the sound generator between the pedal and the base portion to create a first animal call sound in response to the degree of pedal portion movement toward the depressed position.

2. The animal call of claim 1, further comprising a spring to bias the pedal portion toward the neutral position.

3. The animal call of claim 2, wherein the sound generator is adjustable to produce a plurality of unique animal call sounds.

4. The animal call of claim 2, wherein the sound generator is selectively removable.

5. The animal call of claim 2, wherein the sound generator includes an air pump creating an air flow in response to movement of the pedal, the air flow causing the first animal call sound.

6. The animal call of claim 5, wherein the air pump is a bellows or a bladder.

7. The animal call of claim 6 wherein the sound generator further includes a reed and an o-ring selectively manually positionable to vary a vibrating length of the reed thereby allowing adjustment of the animal call sound.

8. The animal call of claim 2, further comprising one or more additional independently moveable pedal portions and sound generators connected to the fixed base portion.

9. A foot-operated animal call comprising:
- a fixed base portion;
- a moveable pedal portion pivotally connected to the base portion and moveable between generally opposing first and second depressed positions and having a neutral position between the opposing depressed positions;
- a first sound generator disposed between the pedal portion and the base portion at a first position, movement of the pedal portion toward the first depressed position compressing the first sound generator between the pedal portion and the base portion to create a first animal call sound in response to the degree of pedal movement toward the first depressed position; and
- a second sound generator disposed between the pedal portion and the base portion at a second position, movement of the pedal portion from the neutral position toward the second depressed position compressing the second sound generator between the pedal portion and the base portion to create a second animal call sound in response to the degree of pedal movement from the neutral position toward the second depressed position.

10. The animal call of claim 9, wherein the pedal portion is biased toward the neutral position.

11. The animal call of claim 10, wherein the first and second sound generators each include an air pump creating an air flow in response to respective movement of the pedal, the air flow being directed through a respective reed thereby causing the respective animal call sound.

12. The animal call of claim 11, wherein the air pump is a bellows or a bladder.

13. The animal call of claim 12, wherein the first and second sound generators each include a reed with a manually positionable o-ring, selective position of each o-ring varying a vibrating length of each respective reed thereby allowing adjustment of each respective animal call sound.

* * * * *